(No Model.)

V. M. HARRIS.
SECONDARY BATTERY.

No. 581,283.  Patented Apr. 27, 1897.

Witnesses.
E. T. Wray.
Donald M. Carter

Inventor:
Varian M. Harris.
by Francis W. Parker
Atty

UNITED STATES PATENT OFFICE.

VARIAN M. HARRIS, OF CHICAGO, ILLINOIS, ASSIGNOR, BY MESNE ASSIGNMENTS, TO THE LEE & COMPANY, OF SAME PLACE.

SECONDARY BATTERY.

SPECIFICATION forming part of Letters Patent No. 581,283, dated April 27, 1897.

Application filed July 6, 1896. Serial No. 598,150. (No model.)

*To all whom it may concern:*

Be it known that I, VARIAN M. HARRIS, a citizen of the United States, residing at Chicago, in the county of Cook and State of Illinois, have invented certain Improvements in Secondary Batteries, of which the following is a specification.

My invention relates to storage batteries, and has for its object to provide certain new and useful improvements in storage batteries more particularly set out hereinafter.

I will first describe somewhat fully the construction of a battery which contains my invention, and will then more fully indicate some of the advantages and distinguishing peculiarities of the same. This particular form of my invention is illustrated in the accompanying drawings, wherein—

Figure 2:
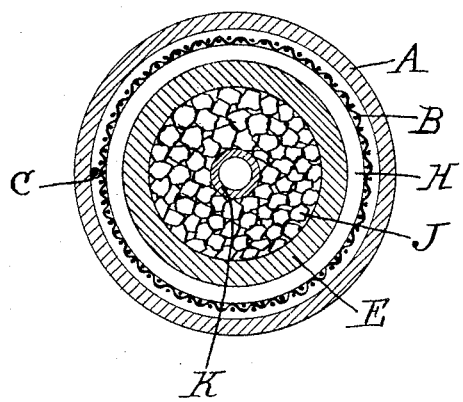
Figure 1:
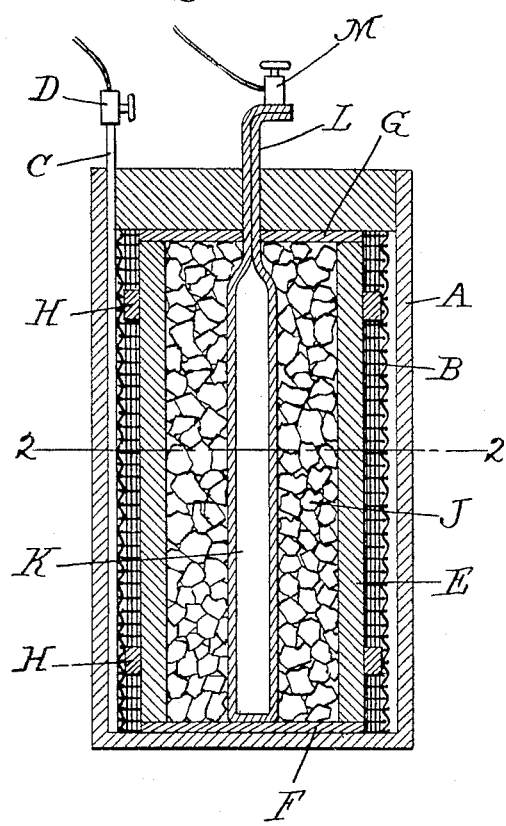
Figure 3:
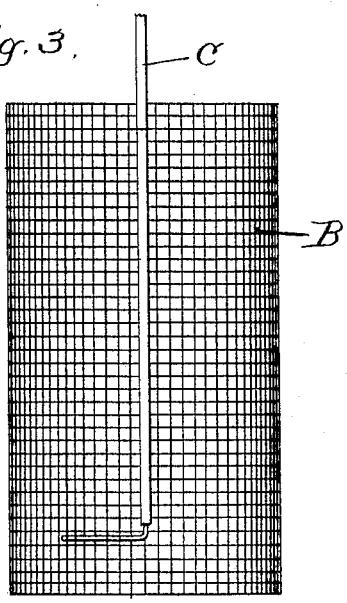

Figure 1 is a vertical section. Fig. 2 is a horizontal section on the line 2 2 of Fig. 1. Fig. 3 is a view of the negative electrode.

Like parts are indicated by the same letter in all the figures.

A is the exterior cup or case of the cell. B is the negative element thereof, consisting, primarily, of a gauze-like cylinder, from which leads the conductor C to the terminal D. E is an interior porous cup, case, or the like, preferably sealed by caps F G. This porous cup and the outer gauze cylinder are kept in proper relation by the rings H. Within the porous cup there are, first, a mass of active material J and then an inner metallic part K, preferably circular in cross-section and also preferably tubular. This terminates in the upper end L, which leads to the terminal M. The electrolyte, of course, is introduced between the porous cup and the outer cup or case. This electrolyte I have used a solution of sulfate of cadmium. This, as described, constitutes a complete battery, one in which my invention is made use of. As previously suggested, however, I do not wish to be limited to this particular form or precise relation of parts or to this particular electrolyte. All that I have described up to the present time is but an example, so to speak, of my invention, and of course, as will appear from further developments, some of these features and elements can be retained to that extent in my invention while others are dispensed with.

I will now proceed to a more detailed examination of the several features of my battery, illustrating and explaining the several objects to be attained and referring to the difficulties obviated by my invention.

Referring to the positive electrode, the inner metallic part is, as stated, preferably circular in cross-section, the principal point being that it should present a continuous exterior surface, as distinguished from a surface broken up by sharp edges or points. This metallic part, if having such broken surface, it is found by experience, is speedily reduced to peroxid of lead, and evidently the metallic strip will be even reduced wholly at such points to peroxid of lead, and thus the operation of the battery is greatly limited and interfered with. If this metallic part be made approximately circular, it is best to make it tubular, as a less amount of metal, hence a less weight, is used. Another advantage flowing from this form of construction of the metal is that the active material of whatever kind or description may be arranged for a uniform layer about this center lead or metal. Thus if the porous cup E be also circular in cross-section the active material will be inclosed between circular walls and will assume the form of an annulus, as indicated in Fig. 2. Hence the current in every direction passes through an equal amount of the active material and passes wholly through the active material, so as to produce a high efficiency and uniform action. This cup so shaped is preferably sealed at each end by the caps F and G, preferably of insulating material, so that the current has no tendency to pass therethrough, but only passes through the porous cup and the active material to the lead.

Of course the porous cup may have substituted for it any sort of suitable support or containing device, but I prefer the porous cup.

The negative element comprises, preferably, a wire-cloth. Of course instead of a wire-cloth a similar arrangement—as, for example, a series of interwoven rods—could be used, but in practice I employ copper-wire cloth, and to it attach the conductor which leads to the terminal. This wire-cloth is dipped in mercury or subjected to a mercury treatment, so as to have formed on its wires a mercury coating. Now in the attempt to apply mercury to flat surfaces it is found that the mercury gets out and escapes—that is to say, if mercury be applied to the flat surface of a plate, as the surface of the negative element in a storage battery, the mercury will gradually escape from the metal of the plate and drip down. With a wire cloth or gauze this tendency is obviated. The mercury has an extended surface on which to adhere, and is also held in position at the numerous points at which the wires overlap each other.

The electrolyte which I employ is a neutral salt, and, of course, there are many which could be employed. I use sulfate of cadmium as an example. When these parts are all suitably assembled in the complete storage battery, the current is applied and the metallic cadmium is produced and deposited on the negative element evenly. It would commonly be deposited as a mere surface deposition. In this operation sulfuric acid is produced, but not in sufficient quantities to continue local action when the circuit is open. In the action of discharging the battery the above process is reversed, the metallic cadmium produced and deposited on the mercury-covered gauze and recombined with the electrolyte, and the free sulfuric acid disappears. When the circuit is left open, the quantity of free sulfuric acid is insufficient to effect a recombination with the metallic cadmium, and therefore little, if any, so-called "local" action takes place.

As previously stated, my electrolyte consists of a neutral salt without any associated acid.

It is understood there must be a sufficient and suitable quantity of mercury for a negative element and that this mercury must be evenly distributed. Otherwise there will be an insufficient and imperfect amalgamation and local action will result when the circuit is open. The caps F and G and the ring H may be of hard rubber.

I have in the claims alluded to certain elements and substances—as, for example, I have spoken of "copper," but of course it will be understood that I mean the equivalent or similar substances known to be used in such manner.

I claim—

1. A storage battery comprising an outer retaining case or cup, an outer cylindrically-shaped gauze-like body constituting the negative element, an inner cylindrical porous cup, a central cylindrical positive element having a smooth unbroken surface, a mass of active material annular in cross-section interposed between the walls of the porous cup and the surface of the opposite element, the two elements and the active material arranged symmetrically about a common axis, and a suitable fluid in the retaining-cup.

2. A storage battery comprising an outer retaining case or cup, an outer cylindrically-shaped mercury-covered copper gauze-like body constituting the negative element, an inner cylindrical porous cup, a central cylindrical positive element having a smooth unbroken surface, a mass of active material annular in cross-section interposed between the walls of the porous cup and the surface of the opposite element, the two elements and the active material arranged symmetrically about a common axis, and a suitable fluid in the retaining-cup.

3. A storage battery comprising a central metallic positive element, a porous cup surrounding the same, a mass of active material within the cup and about the element, an outer copper-gauze mercury-covered negative element, a case or cup to contain the whole, and a suitable fluid within the same.

4. A storage battery comprising a central metallic positive element, a porous cup surrounding the same, a mass of active material within the cup and about the element, an outer copper-gauze mercury-covered negative element, an insulation-seal at each end of the porous cup, a case or cup to contain the whole, and a suitable fluid within the same.

Chicago, July 3, 1896.

VARIAN M. HARRIS.

Witnesses:
FRANCIS W. PARKER,
LILLEY W. JOHNSTONE.